US005783509A

United States Patent [19]

Manier

[11] Patent Number: 5,783,509
[45] Date of Patent: Jul. 21, 1998

[54] PROCESS FOR PREPARING A REFRACTORY POWDER FROM SPENT CONTACT MASSES ISSUING FROM THE PRODUCTION OF SILANES, AND TO REFACTORY PRODUCTS OBTAINED THEREFROM

[75] Inventor: Fernanda Manier, Passy, France

[73] Assignee: PEM Abrasifs Refractaires, La Defense, France

[21] Appl. No.: 807,699

[22] Filed: Feb. 28, 1997

[30] Foreign Application Priority Data

Mar. 4, 1996 [FR] France .................................. 96 02982

[51] Int. Cl.$^6$ .................................................. C04B 35/584
[52] U.S. Cl. ........................... 501/97.1; 501/92; 501/98.1; 423/344
[58] Field of Search ........................ 423/344; 501/92, 501/96.5, 97.1, 97.2, 98.1, 96.2

[56] References Cited

U.S. PATENT DOCUMENTS 5,274,158  12/1993  Webb et al. .
5,314,675  5/1994  Dubots et al. .

FOREIGN PATENT DOCUMENTS

| 29 33 342 | 3/1981 | Germany . |
| 31 31 732 | 2/1983 | Germany . |
| 42 05 980 | 9/1993 | Germany . |
| 58-156580 | 9/1983 | Japan . |
| 1797255   | 1/1996 | U.S.S.R. . |

*Primary Examiner*—Karl Group
*Attorney, Agent, or Firm*—Pollock, Vande Sande & Priddy

[57] ABSTRACT

The invention relates to a process for the preparation, by nitriding, of a refractory powder containing more than 40% of silicon nitride from spent contact masses issuing from chlorosilane synthesis. The process involves mixing with the copper-free spent mass, silicon or a silicon-rich alloy and optionally a refractory compound to adjust the non-oxidised silicon content to a predetermined value >30%, heating the mixture in a nitrogen atmosphere to trigger the exothermic nitriding reaction, then reducing the product obtained to powder. The refractory powder thus obtained can be mixed with an organic binder to produce taphole blocking masses for blast furnaces or electric furnaces for pyrometallurgy.

7 Claims, No Drawings

PROCESS FOR PREPARING A REFRACTORY POWDER FROM SPENT CONTACT MASSES ISSUING FROM THE PRODUCTION OF SILANES, AND TO REFACTORY PRODUCTS OBTAINED THEREFROM

FIELD OF THE INVENTION

The invention relates to a process for preparing refractory powder containing at least 40% of silicon nitride from spent contact masses issuing from the chlorosilane or organochlorosilane synthesis reaction used in the manufacture of silicones.

It also relates to a particular composition of refractory powder having silicon nitride as its main constituent as well as refractory products produced from this powder, in particular masses for blocking tapholes of blast furnaces and electric arc furnaces.

STATE OF THE ART

Silicones are synthesised mainly from dimethyldichlorosilane obtained by the attack of powdered metallurgical silicon with gaseous methyl chloride at about 300° to 350° C. in the presence of a copper catalyst. This reaction, known as the ROCHOW reaction, is employed throughout the world and leaves large quantities of residues, known as spent contact masses, in the form of mud in which various metallic elements are concentrated in the form of silicides ($FeSi_{2.4}$, $TiSi_2$, $Cu_3Si$), oxides and silicates.

Although these spent masses have ceased being reactive in the operating conditions of the ROCHOW reaction, they are still highly reactive when returned to the air and have to be passivated and treated before being discharged. There are numerous treatment processes which generally involve oxidizing the product either in air or in an aqueous medium. General Electric's U.S. Pat. No. 5,274,158 thus proposes that the spent masses be stablized by heating to between 900° and 1500° C. in inert gas, for example nitrogen, before discharge.

None of the proposed solutions considers the recycling of the spent masses. In fact, their chemical composition, in particular their silicon content, is very variable while their oxide, in particular $SiO_2$ content is high.

SUMMARY OF THE INVENTION

The object of the invention is to avoid discharging spent masses issuing from the ROCHOW reaction and to use them for preparing, by nitriding, refractory powders based on silicon nitride suitable for the preparation of refractory products, in particular masses for blocking tapholes of blast furnaces and arc furnaces.

The invention relates to a process for preparing a refractory powder containing at least 40% by weight of silicon nitride from spent contact masses issuing from chlorosilane synthesis; The process includes the steps of a) treating the spent mass so as to remove the copper from it if necessary, b) mixing the copper-free mass with silicon or a silicon-rich alloy and optionally a powdered refractory compound so that the non-oxidized silicon content of the mixture is adjusted to a predetermined value >30% by weight, c) heating this mixture in a nitrogen atmosphere to trigger the exothermic nitriding reaction, and d) reducing the nitrided product obtained to powder.

The powdered refractory compound added to the mixture in stage b) is preferably alumina, for example in the form of bauxite powder, or silicon nitride, originating, for example, from a previous operation, or both. Aluminum, in the form of slag powder can be added to the mixture to be nitrided instead of or in addition to alumina.

The invention also relates to a refractory powder containing 40 to 80% (by weight) of silicon nitride, 5 to 40% of sialon, 5 to 15% of silicon carbide and 1 to 25% of iron silicide FeSi, optionally sinoite $Si_2ON_2$ in a quantity of less than 20%, the other constituent not exceeding a total content of 5%.

Finally, the invention relates to refractory products, in particular to masses for blocking tapholes of blast furnaces or arc furnaces, produced from refractory powders having the previous composition or issuing from the process according to the invention.

DESCRIPTION OF PREFERRED EMBODIMENT

If the residues recovered at the outlet of the dichlorodimethylsilane synthesis reactor contain copper originating from the use of a copper catalyst in the reaction, they are first treated in a known manner, for example with a dilute sulfuric acid solution (between 15 and 50%) at a temperature between 20° and 100° C. to eliminate the copper in the form of a sulfate solution which can be reused. The insoluble fraction, i.e. the copper-free mass, is dried and has the form of a powder with a grain size smaller than 0.1 mm.

The spent contact mass can contain a very variable proportion of non-oxidized silicon depending on the origin of the spent contact mass and the reaction conditions. This variability is a major obstacle to recycling of the spent contact mass in industrial applications, which require a minimum level of reproducibility. The applicants had the idea of correcting this non-oxidized silicon content and stabilising it to a value which is always higher than 30% of the weight of the charge to be nitrided in order to obtain a reusable product. To this end, metallurgical silicon, powder or powder of an alloy having a high silicon content such as ferrosilicon containing 75% of Si with a grain size smaller than 0.16 mm, is added to the copper-free contact mass powder.

If the copper-free mass has a high silicon content, powdered alumina and/or aluminium; is added to the previous mixture in order to transform the silica during subsequent nitriding into sialon $Si_3Al_3O_3N_5$ while as far as possible avoiding the formation of sinoite $Si_2ON_2$ which is obtained in the absence of aluminium;

The mixture is then heated in a furnace under a nitrogen atmosphere for nitriding by the process described in applicants' patent EP 0494129, while adding a certain quantity of refractory compound powder to the mixture to act as thermal ballast.

This compound can be based, for example, on silicon nitride such as the refractory powder issuing from a previous implementation of the process. In this case, the silicon contributed by the added nitride should be taken into consideration when assessing the pre-existing, non-oxidized silicon before the adjustment thereof. Similarly, the silicon liberated by the transformation of the silicide $FeSi_{2.4}$ into FeSi by the reaction $FeSi_{2.4} \rightarrow FeSi + 1.4\ Si$ should be taken into consideration in the spent mass.

The silicon to be added in order to attain the predetermined value corresponding to the silicon nitride content to be obtained in the final product is calculated from all the non-oxidized silicon originating from the spent mass and the optional nitride. This predetermined value should be higher than 30% to correspond approximately to the minimum acceptable content of 40% of nitride for the considered applications.

The refractory compound acting as thermal ballast for nitriding can also contain the above-mentioned alumina for transforming silica into sialon. Heating is carried out at atmospheric pressure until the moment when the fast exothermic nitriding reaction is initiated and efforts are made to maintain this temperature while acting on the flow of nitrogen.

A product consisting mainly of silicon nitride $Si_3N_4$ in a proportion by weight of between 40 and 80% and also containing sialon (from 5 to 40%), silicon carbide SiC (between 5 and 15%) and iron silicide FeSi (between 1 and 25%) is thus obtained. The product can contain sinoite $Si_2ON_2$, but its proportion should not exceed 20% if the properties for use are to be maintained. It can also contain other products such as silicides in a total proportion of less than 5%. It can easily be reduced to powder by crushing.

A particularly appropriate application of the product according to the invention is the preparation of masses for blocking tapholes of blast furnaces or electric arc furnaces. These blocking masses are normally prepared by mixing a refractory powder, generally silicon nitride, and a thermosetting organic binder, this mixture being injected into the tapholes, so as to produce a perfect seal during blocking, to allow easy perforation during the subsequent casting operation and to resist erosion by the fusion products throughout the casting operation. The refractory powder according to the invention has been found to be particularly suitable for this application when using as binder, for example, a carbonaceous product such as a luting paste or a paste intended for the continuous manufacture of self-baking electrodes, also known as Soderberg electrodes, used in igneous electrolysis cells or arc furnaces.

The refractory powder can also be sintered for manufacturing refractory articles in the same way as pure silicon nitride powder.

EXAMPLES

Example 1

Residues from the manufacture of dichlorodimethylsilane were recovered at the outlet of a synthesis reactor and were treated with a sulfuric acid solution to remove the copper from them. 100% of the insoluble fraction collected and dried had a grain size smaller than 50 μm and the following composition (by weight):
Si:38% $FeSi_{2.4}$:21% $SiO_2$:24% C:9% SiC:3% $Al_2O_3$: 2% Ti:1%

300 kg of this powder were mixed with 50 kg of powdered aluminum having a grain size <0.8 mm, 150 kg of metallurgical silicon powder having a grain size <0.16 mm and 250 kg of refractory powder having a grain size <0.2 mm obtained by grinding the product resulting from the previous preparation with the same mode of operation. The mixture was introduced into a furnace under a nitrogen atmosphere heated to a temperature of 1350° C. and the flow of nitrogen was adjusted to maintain this temperature. The product obtained had approximately the following composition:
$Si_3N_4$:55% sialon:27% SiC:11% FeSi:5% $Ti_5Si_3$:0.5% others:1.5%.

This product was reduced to powder having a grain size of <0.16 mm and was mixed with the carbonaceous paste normally used for Soderberg type electrodes in a proportion of 2/3 of powder for each 1/3 of paste. The plastic mass obtained was tested as a blocking mass on a 20 MW submerged arc furnace producing ferrosilicon containing 75% of Si. The quality of blocking and the ease of reperforation were quite similar to those of the prior art.

Example 2

360 kg of powder of the copper-free spent mass from the previous example were mixed with 200 kg of powdered silicon having a grain size <0.16 mm and 250 kg of refractory powder having a grain size <0.2 mm obtained by grinding the product of a previous treatment operation. This mixture was nitrided under the same conditions as in the previous example. The product obtained had approximately the following composition: $Si_3N_4$:50% sialon:2% $SiON_2$:29% SiC:12% FeSi:6% others:1%.

This product was reduced to powder having a grain size of <0.16 mm and was mixed with molten Soderberg paste in a proportion of 2/3 of powder for each 1/3 of paste. The mixture was injected as a blocking mass under the same conditions as in the previous example and some seeping of liquid metal through the stopper, which is a sign of a less satisfactory seal resulting from the excessively high content of sinoite $Si_2ON_2$, was observed.

Example 3

350 kg of powder of the copper-free mass from the previous examples were mixed with 275 kg of ferrosilicon powder with 75% of Si (grain size <0.16 mm), 25 kg of aluminum powder (grain size <0.8 mm) and 250 kg of refractory powder (grain size <0.2 mm) issuing from the nitriding process in example 1. This mixture was nitrided under the same conditions as in example 1.

The product obtained had approximately the following composition: $Si_3N_4$:47% sialon:13% $Si_2ON_2$:13% SiC:11% FeSi:15% others:1%.

This product was reduced to powder, mixed with the Soderberg paste and injected as a blocking mass under the same conditions as before. This blocking mass yielded satisfactory results, demonstrating that the residual $Si_2ON_2$ content no longer has a harmful effect.

Example 4

300 kg of the copper-free spent mass from example 1 were mixed with 235 kg of ferrosilicon containing 75% of Si (grain size <0.16 mm), 75 kg of aluminum powder (grain size <0.8 mm), 35 kg of Bayer alumina and 250 kg of refractory powder resulting from a previous operation.

The product nitrided under the same conditions as before had the following approximate composition:
$Si_3N_4$:46% sialon:31% SiC:9% FeSi:13% others:1%.

After being reduced to powder and mixed with the Soderberg paste as in the previous examples, it was injected as a blocking mass and was found to be quite satisfactory.

I claim:

1. A process for preparation, by nitriding to form a refractory powder containing more than 40% of silicon nitride by weight from spent contact masses issuing from chlorosilane synthesis, said process comprising the steps of:

(a) treating the spent masses so as to remove any copper;
    (b) mixing said treated masses with silicon or a silicon-rich alloy and optionally a powdered refractory compound so a non-oxidized silicon content of the mixture to be nitrided is adjusted to a value of >30% by weight;

(c) heating the mixture in a nitrogen atmosphere to trigger an exothermic nitriding reaction to obtain a nitrided product; and (d) reducing said nitrided product to obtain a powder.

2. The process according to claim 1, wherein the refractory compound added in step (b) contains silicon nitride.

3. The process according to claim 2, wherein the refractory compound is the refractory powder obtained from a previous implementation of the process.

4. The process according to claim 1, wherein the refractory compound added in step (b) is alumina.

5. The process according to claim 4, wherein the alumina is introduced in the form of bauxite.

6. The process according to claim 1, wherein aluminum is added in step (b).

7. The process according to claim 6, wherein the aluminum is in the form of slag.

* * * * *